Jan. 22, 1963 J. L. WIRTH 3,075,053

SOUND REPRODUCING DEVICE

Filed Dec. 11, 1958

Inventor
John L. Wirth

By:
Graf, Nierman & Burmeister
Attorneys 3,075,053

SOUND REPRODUCING DEVICE

John L. Wirth, Three Oaks, Mich., assignor to Electro-Voice, Incorporated, Buchanan, Mich., a corporation of Indiana Filed Dec. 11, 1958, Ser. No. 779,625
15 Claims. (Cl. 179—100.41)

The present invention relates generally to stereophonic phonographs, and more particularly to stereophonic pickups for use in such phonographs.

The patent application of Wiggins and Wood, entitled "Piezoelectric Transducer," Serial No. 721,188, filed March 13, 1958, discloses a stereophonic phonograph in which a single piezoelectric element is connected between two sound channels. In one embodiment of the invention there disclosed, an element has two pair of confronting electrodes which abut the surface of a piezoelectric body, and an interior bore within the body contains an electrically conducting coating forming a center conductor. Two preferred constructions are set forth in the Wiggins and Wood application referred to above, the one construction connecting the electrodes of each pair together and connecting the center conductor to the ground terminal of each of the sound channels. In the other construction, a push-pull input is employed for each of the sound channels, and one of the electrodes of each pair is connected to one of the input terminals of each push-pull input. The application states that inadequate isolation between chanels is achieved if one of the inputs of each pair is connected to the input terminal of a single ended stage, and the other electrode of that pair connected to the ground terminal. This construction is referred to as series connection of the piezoelectric element because the piezoelectric element has two signal generating sections which are connected in series across the input of the amplifier of each sound stage. Even though the piezoelectric element need not have a center conductor, this construction will be referred to in this specification as a series connected piezoelectric element.

It is one of the objects of the present invention to provide a stereophonic phonograph with a single element piezoelectric pickup connected in series between the input and ground terminal of each of the sound stages which exhibits improved isolation between channels.

It is a further object of the present invention to provide a single element piezoelectric phonograph pickup which may be connected in series between sound channels with substantially improved isolation between channels.

Further objects and advantages of the present invention will be readily understood from a further consideration of this disclosure, particularly when viewed in the light of the dawings, in which.

Figure 1:
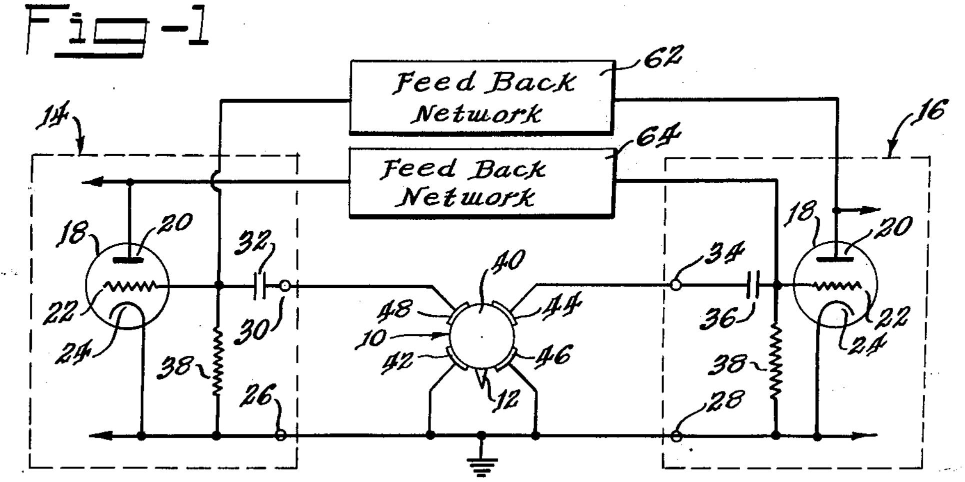
FIGURE 1 is a schematic electrical circuit diagram of a stereophonic phonograph constructed according to the teachings of the present invention.

FIGURE 1 illustrates a stereophonic phonograph having a pickup 10 with a stylus 12 connected between the input stages of two sound channels 14 and 16. The input stage of each sound channel 14 and 16 has a vacuum tube 18 with a plate 20, grid 22 and cathode 24. The cathode 24 of the sound channel 14 is connected to an output terminal 26, and the cathode 24 of the sound channel 16 is connected to an output terminal 28, these terminals 26 and 28 being interconnected and forming a common ground connection. The grid 22 of sound channel 14 is connected to a second input terminal 30 through a capacitor 32, and the grid 22 of sound channel 16 is connected to a second input terminal 34 through a capacitor 36. The grids 22 are connected to the ground connector through resistors 38. Since the sound channels may be conventional, and the input stages of the sound channels are conventional in other respects, they will not be further described.

Figures 2, 3, 4:
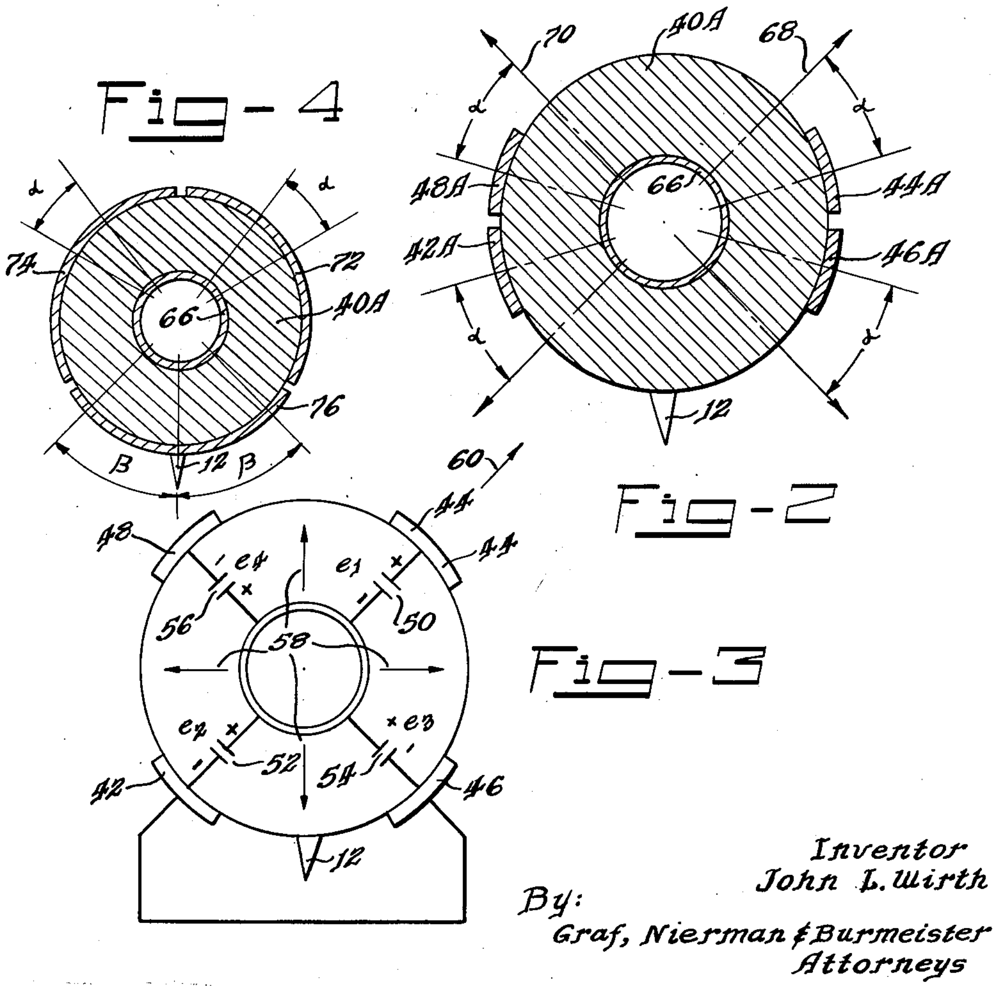
FIGURE 2 is a transverse sectional view of a piezoelectric element of a pickup which constitutes a second embodiment of the present invention.
FIGURE 3 is a schematic electrical circuit diagram of the piezoelectric phonograph pickup illustrated in FIGURE 2.
FIGURE 4 is a transverse sectional view of a piezoelectric element which constitutes another embodiment of the invention.

The phonograph pickup 10 has an elongated body 40 of piezoelectric material, particularly suitable material being artificial piezoelectric materials such as barium titanate, lead zirconium titanate, and other titanates. As illustrated in FIGURES 1 and 3, two pairs of confronting electrodes 42 and 44, and 46 and 48 are disposed on the exterior surface of the body 40, each pair being on a plane normally disposed to the plane of the other pair.

Stereophonic phonograph record discs are provided with two sound channels impressed upon a single groove of the record, the two sound channels being impressed on the record along axes orthogonally related to each other. Two systems are presently being employed for stereophonically recording record discs. With the one system, the one channel is impressed upon the disc along an axis normal to the surface of the disc, and the other channel is impressed along an axis parallel to the surface of the record disc. The more prevalent recording system impresses both recording axes at 45 degree angles to the surface of the recod disc, and the pickup here illustrated is designed for use with this latter system, although it is clear that the invention may be practiced with a pickup designed for the former system. In either case, one pair of electrodes is disposed on a plane parallel to each of the recording axes. As illustrated in the FIGURES, the pairs of electrodes are disposed on planes oriented at 45 degrees relative to the plane of the stylus 12 for use with records recorded by the second recording system referred to above.

FIGURE 3 diagammatically illustrates the schematic electrical circuit of the phonograph pickup 10. The electrodes 42 and 44 of the first pair are shown interconnected by capacitors 50 and 52 connected in series, and the electrodes 46 and 48 are shown interconnected by capacitors 54 and 56 connected in series. This is true whether the phonograph pickup has a center element in the piezoelectric body 40 or not, since compression occurring on one surface of the element produces a first potential and also results in elongation on the opposite surface of the element producing an opposite second potential, and the two potentials are serially connected within the element.

In FIGURE 3, the polarization axis is assumed to be along the direction of the arrows 58, so that a deflection or bending of the element 10 in the plane of the electrodes 42 and 44, as illustrated by the arrow 60, will result in a positive potential appearing on the electrode 44 and a negative potential on the electrode 42. In other words, a charge $e1$ will be developed across capacity 50 and an equal charge will develop across capacity 52. However, since capacity 52 is connected in parallel with capacity 54, the charge developed across capacity 52 will be equally divided across capacity 52 and 54 resulting in a charge $e2$ equal to a charge $e3$ across capacity 54 and equal to one-half that of $e1$. Further, the charge $e3$ is connected in the input of sound channel 14 and constitutes unwanted crosstalk.

Referring again to FIGURE 1, a feedback network 62 is connected from the plate 20 of sound channel 16 to the grid 22 of sound channel 14 to generate a potential equal and opposite to that generated across capacity 54, thereby bucking out the potential $e3$ from the sound channel 14 and restoring isolation between the sound channels. The network 62 may consist of any of the conventional circuit elements for producing a potential equal and opposite to the potential impressed on the grid 22 as a result of the charge developed across the capacity 54 of the pickup 10. Since the same decrease in channel isolation occurs when the element 10 is displaced along an axis parallel to the plane of the electrodes 46 and 48, a second feedback network 64 is connected between the plate 20 of the sound channel 14 and the grid 22 of the sound channel 16 for the same purpose.

In FIGURE 2, a phonograph pickup is illustrated which itself generates the bucking potential for minimizing crosstalk, and which may be used in a series connection between sound channels without employing feedback networks 62 or 64 and without reducing the isolation between channels. In FIGURE 2, a hollow cylindrical piezoelectric element 40A driven by a stylus 12 is provided with two pairs of electrodes 42A and 44A, and 46A and 48A. The electrodes 42A and 44A are disposed on a common plane passing through the axis of the element 40A, and the electrodes 46A and 48A are also disposed on a plane passing through the axis of the element. The interior surface of the element is coated with an electrically conducting layer 66. Also, the record undulations of one channel are impressed upon the element 40A parallel to the plane designated 68, and those of the other channel are impressed upon the element parallel to the plane 70 which is disposed normal to the plane 68.

If it is assumed that the record undulations are impressed upon the element 40A parallel to the axis 68, the maximum signal for a given undulation can be obtained by placing the electrodes on the exterior surface of the element at the intersection of the axis 68. In like manner, the minimum signal, approaching zero, is obtained by placing the electrodes on the surface of the element 40A at intersections of the axis 70. Likewise, between these limits intermediate potentials may be obtained which are sinusoidally related to these axes. Further, the potential developed on an electrode disposed on one side of the axis 70, for the assumed undulation impressed along the axis 68, will be positive, while it will be negative on the other side of the axis 70.

Referring again to FIGURES 2 and 3, it is clear that the potential developed across capacity 54, referred to as $e3$, can be bucked out by displacing the electrode 48A from the axis 70 toward the electrode 42A. Further, if the electrodes 42A and 44A are disposed on the axis 68, the electrode 48A will clearly buck out the potential developed between the conducting layer 66 and the electrode 46A (disposed on the axis 70), by placing the electrode 46A at an angle of 30 degrees from the axis 70 toward the electrode 42A. This results from the fact that the potential $e3$ is one-half of the potential $e1$, and the value of the sine for 30 degrees is one-half.

The same channel isolation may be obtained for the other sound channel, channel 16, by placing the electrode 44A 30 degrees from the axis 68 toward the electrode 46A, the electrode 46A being retained on the axis 70.

It is also possible to permit the electrodes 48A and 44A to be disposed at a 90 degree angle with respect to each other and to displace the electrodes 42A and 46A toward these electrodes, respectively, and thereby generate equal and opposite bucking potentials across capacities 52 and 54, thus cancelling the potentials $e2$ and $e3$. In such a construction, the electrode 42A is displaced toward the electrode 48A by an angle of approximately 14 degrees from the axis 68, and the electrode 46A is displaced toward the electrode 44A from the axis 70 by an equal angle. This construction, however, cancels one-half of the signal generated by the element and reduces its output by that amount.

FIGURE 2 specifically illustrates the two effects combined and the pairs of electrodes disposed on axes passing through the center of the piezoelectric body 40A. The axis of each pair of electrodes is disposed at an angle, designated $\alpha$, to the orthogonal axes 68 and 70. The electrode 48A is disposed from the axis 70 toward the electrode 42A by an angle of approximately 27 degrees, and the electrode 42A is disposed toward the electrode 48A from the axis 68 by an angle of approximately 27 degrees measured to the center of the electrode. Under these conditions, the pickup produces a substantial output, even though lower than the output which results from the pairs of electrodes being disposed upon the axes 68 and 70, but an output with a minimum of crosstalk.

The artificial piezoelectric body 40A may be polarized in one of two ways. It may be polarized by connecting all four electrodes 42A, 44A, 46A, and 48A to one terminal of a direct current source and the center electrode 66 to the other terminal of the source, thereby producing a radial axis of polarization, such as shown by the arrows 58 in FIGURE 3. The element may also be polarized by connecting two adjacent electrodes to one terminal of the direct current power source, and the other two adjacent electrodes to the other terminal of the power source, thereby producing a polarization axis through the element. The center conductor 66 is not necessary to practice the invention, and is illustrated for the purposes of providing radial polarization and increasing the capacity of the pickup.

It is also possible to practice the present invention with only three electrodes disposed on the piezoelectric element, as illustrated in the embodiment of FIGURE 4, rather than employing the two pairs of electrodes illustrated above. In FIGURE 4, three electrodes 72, 74, and 76 are disposed on the surface of the body, and the electrode 76 is common to both circuits. The body of the piezoelectric element is identical to the body described above, and hence bears the reference numeral 40A, and the body 40A is provided with a center electrically conducting sleeve, again designated 66.

Again this transducer is capable of responding separately to forces impressed upon the element along two orthogonal axes, these axes being illustrated in FIGURE 4. The common electrode 76 is on the bisector of the two axes, and hence the center of the common electrode is located at an angle $\beta$ from each of these axes. Again, the stylus 12 is secured to the body 40A along this bisector when the transducer is employed as a stereophonic phonograph pickup.

Operation of the three electrode transducer becomes apparent if the effect of a single force along one of the designated axes is considered. For simplicity, consider a force to be applied along the axis passing through the electrodes 76 and 72 in a direction to impress a negative charge on the electrode 76. Considering the portion of the surface of the body 40A confronting the electrode 76, the portion of the surface of the body 40A intersecting the force axis is driven to a maximum negative charge which decreases sinusoidally to the portion of the surface of the body intersecting the orthogonal axis, and becomes increasingly positive thereafter. Since the electrode 76 integrates these charges, the net potential of the electrode 76 is negative. The charges developed by the body 40A on the surfaces confronting the electrodes 72 and 74 also vary sinusoidally. These charges are integrated over the surface of electrode 72 to make the electrode assume a positive potential with respect to electrode 76. However, the charges developed on the portion of the body 40A confronting electrode 74 between the axis normal to the force and the electrode 76 are negative, and thus buck the charge developed between the electrode 76 and the sleeve 66, thus reducing the cross talk between channels. This is true whenever the center of the electrode 74 is displaced from the axis normal to the force toward the common electrode 76, the angle of displacement being designated α in FIGURE 4.

In FIGURE 4, all three electrodes 72, 74, and 76 extend about the cylindrical body throughout angles slightly less than 120 degrees. Three electrodes of equal angular extent have proven to be very satisfactory in reducing crosstalk, and also integrate the charges on the surface of the piezoelectric body to a maximum. In addition, substantial capacity is achieved in this manner between the electrodes and the sleeve 66.

The piezoelectric elements disclosed above are intended to be mounted as a bender element, rather than a twister. In a preferred construction, the piezoelectric element is mounted at one end and the stylus at the other end of the element. A preferable construction for mounting this element is disclosed in the patent application of John F. Wood, entitled "Phonograph Pickup," Serial No. 741,517, filed June 12, 1958.

While the present disclosure specifically illustrates the invention in relation to a phonograph pickup, it is clear that the invention has applications beyond phonograph pickups. The invention is applicable to any two channel bender type piezoelectric transducer, whether it is driven by a phonograph stylus or some other means. For example, the present invention could well be utilized to record the vibrations induced along two orthogonally related axes of a mechanical structure. It is therefore intended that the scope of the present invention be not limited by the foregoing disclosure, but rather only by the appended claims.

The invention claimed is:

1. A stereophonic phonograph pickup for producing electrical responses from two channels recorded on a record surface along normally related axes comprising an element having an elongated piezoelectric body and two pairs of spaced electrically insulated electrodes disposed on the sides of the body, the piezoelectric body of said element being polarized to generate in response to deflection of the element along either of said axes potentials of opposite sign on the two portions of the surface of the element intersecting the said axis of the deflecting force, one of the electrodes of each pair being interconnected, the electrodes of each pair being disposed on a plane passing through the axis of the element, the angular separation between the interconnected electrodes relative to the axis of the element exceeding a right angle, and a stylus coupled to the element.

2. A stereophonic phonograph pickup comprising the elements of claim 1 wherein the interconnected electrodes are angularly separated relative to the axis of elongation of the element by an angle of approximately 144 degrees between centers.

3. A stereophonic phonograph pickup for producing electrical responses from two channels recorded on the surface of a record along normally related axes comprising an element having an elongated piezoelectric body and two pairs of electrically insulated electrodes disposed on the surface of the body, the electrodes of each pair being disposed on opposite sides of an axial plane of the element and spaced between the electrode of the other pair, a stylus coupled to the element, means interconnecting one electrode of each pair, and means for generating an opposing potential in series with each pair of electrodes approximately equal to one-third of the potential generated across the other pair of electrodes.

4. A stereophonic phonograph pickup for producing electrical responses from two channels recorded on a record surface along normally related axes comprising an element having an elongated piezoelectric body and two pairs of spaced electrically insulated electrodes disposed on the sides of the body, the piezoelectric body of said element being polarized to generate in response to deflection of the element along either of said axes potentials of opposite sign on the two portions of the surface of the element intersecting the said axis of the deflecting force, the electrodes of each pair being disposed on opposite sides of an axial plane of the element and spaced between the electrodes of the other pair, two of said electrodes being disposed on axes normal to each other and adapted to be interconnected, and the other electrode of each pair being displaced from the axis of the first electrode of said pair toward the first electrode of the other pair by an angle of approximately 30 degrees, and a stylus coupled to the element.

5. A two channel electromechanical transducer comprising an element having an elongated piezoelectric body and two pairs of spaced electrically insulated electrodes disposed on the sides of the body, the piezoelectric body of said element being polarized to generate in response to deflection of the element along either of said axes potentials of opposite sign on the two portions of the surface of the element intersecting the said axis of the deflecting force, one of the electrodes of each pair being interconnected, the electrodes of each pair being disposed on a plane passing through the axis of the element, and the angular separation between the interconnected electrodes relative to the axis of the element exceeding a right angle.

6. A two channel electromechanical transducer comprising the elements of claim 5 wherein the interconnected electrodes are angularly spaced relative to the axis of the element by an angle no greater than 150 degrees.

7. A two channel electromechanical transducer comprising an element having an elongated piezoelectric body and two pairs of electrically insulated electrodes disposed on the sides of the body, the piezoelectric body of said element being polarized to generate in response to deflection of the element along either of said axes potentials of opposite sign on the two portions of the surface of the element intersecting the said axis of the deflecting force, one of the electrodes of each pair being adapted to be interconnected, the electrodes of each pair being disposed on a plane passing through the axis of the element, and the angular separation between the electrodes adapted to be interconnected relative to the axis of the element exceeding a right angle, said element having a channel extending therethrough, and an electrically conducting layer disposed on the channel.

8. A stereophonic pickup for producing electrical responses from two channels recorded on a record surface along normally related axes comprising an element having an elongated piezoelectric body and an axial channel extending therethrough, an electrically conducting layer disposed on the surfaces of said channel, the piezoelectric body of said element being polarized to generate in response to deflection of the element along either of said axes potentials of opposite sign on the two portions of the surface of the element intersecting the said axis of the deflecting force, two pairs of spaced electrically insulated electrodes disposed on the outer surface of the piezoelectric body, one of the electrodes of each pair being interconnected, the electrodes of each pair being disposed on a plane passing through the axis of the element and the angular separation between centers of the interconnected electrodes being greater than a right angle and no greater than 150 degrees, and a stylus coupled to the element.

9. An electromechanical transducer for simultaneously generating in response to a single force two electrical signals responsive to the magnitude of the components of the force exerted along two orthogonally related axes comprising an elongated piezoelectric body, the piezoelectric body being polarized to generate in response to deflection of the body along either of said orthogonally related axes potentials of opposite sign on the two portions of the surface of the body intersecting the said axis of the deflecting force, means to impress the force on the body generally normal to the axis of the body, the orthogonal components of the force to be resolved being disposed on planes intersecting on the axis of the body, a first electrode disposed on the surface of the body between the axial planes, and two other electrodes disposed on the surface of the body on opposite sides of a third axial plane of the body which bisects the angle between the force axes.

10. An electromechanical transducer comprising the elements of claim 9 wherein each of the three electrodes is approximately the same size, and the three electrodes substantially surround the body.

11. A phonograph pickup comprising a transducer including the elements of claim 9, means for mounting the transducer attached to one end of the body, and a stylus attached to the other end of the body.

12. An electromechanical transducer for simultaneously generating in response to a single force, two electrical signals responsive to the magnitude of the components of the force exerted along two orthogonally related axes comprising a piezoelectric body having an axis of elongation, means for mounting the body at one end of the axis of elongation, means for impressing the force on the other end of the body normal to the axis of elongation, the body being electrically polarized to produce charges on the areas of the surfaces of the body adjacent to each plane defined by the axis of elongation and the two orthogonally related force components in response to forces exerted on said body, a force exerted along one of said planes producing charges of opposite polarity on the opposing areas of the surface of the body adjacent to said plane, and means defining two electrical circuits through said body, the first circuit extending between the opposing areas of the surface adjacent to one of the planes and the other circuit extending between the opposing areas of the surface adjacent to the other plane, said means electrically interconnecting one of the surface areas of one circuit with one of the surface areas of the other circuit, and said means including an electrode in each circuit disposed abutting the area on the opposite side of the body from the area interconnected with the other circuit, and each of said electrodes having a greater portion thereof abutting the portion of the surface of the body disposed between the plane of said circuit and the adjacent interconnected area of the other circuit than between the plane of said circuit and the adjacent electrode of the other circuit.

13. An electromechanical transducer comprising the elements of claim 12 wherein the interconnected areas of the two circuits abut a common electrode.

14. An electromechanical transducer comprising the elements of claim 12 wherein each of the electrodes is totally disposed between the plane of said circuit and the adjacent interconnected area of the other circuit.

15. An electromechanical transducer comprising the elements of claim 14 wherein the interconnected areas each abut an electrode totally disposed between the plane of its circuit and the adjacent electrode of the other circuit, and an electrical conductor extends between the interconnected areas.

References Cited in the file of this patent

UNITED STATES PATENTS 2,958,738 Gray ------------------- Nov. 1, 1960